(12) United States Patent
Anastas et al.

(10) Patent No.: US 10,211,433 B2
(45) Date of Patent: Feb. 19, 2019

(54) BATTERY PACKAGING

(71) Applicant: Apple Inc., Cupertino, CA (US)

(72) Inventors: George V. Anastas, San Carlos, CA (US); Gregory A. Springer, Los Altos, CA (US); Jack B. Rector, III, San Ramon, CA (US); Joshua R. Funamura, San Jose, CA (US); Kenneth M. Silz, Brentwood, CA (US)

(73) Assignee: Apple Inc., Cupertino, CA (US)

( * ) Notice: Subject to any disclaimer, the term of this patent is extended or adjusted under 35 U.S.C. 154(b) by 368 days.

(21) Appl. No.: 14/041,921

(22) Filed: Sep. 30, 2013

(65) Prior Publication Data

US 2014/0147737 A1 May 29, 2014

Related U.S. Application Data

(60) Provisional application No. 61/730,148, filed on Nov. 27, 2012.

(51) Int. Cl.
*H01M 2/02* (2006.01)
*H01M 10/04* (2006.01)

(52) U.S. Cl.
CPC ....... *H01M 2/0287* (2013.01); *H01M 2/0202* (2013.01); *H01M 2/0217* (2013.01);
(Continued)

(58) Field of Classification Search
None
See application file for complete search history.

(56) References Cited

U.S. PATENT DOCUMENTS

| 3,655,455 | A | * | 4/1972 | Jones | H01M 2/025 29/623.5 |
| 4,369,225 | A | * | 1/1983 | Manabe et al. | 428/334 |

(Continued)

FOREIGN PATENT DOCUMENTS

| CN | 1144017 | 2/1997 |
| CN | 101640968 | 2/2010 |

(Continued)

OTHER PUBLICATIONS

Invitation to Pay Additional Fees and Partial Search dated Jan. 7, 2014, PCT/US2013/066268, 5 pages.

(Continued)

*Primary Examiner* — Sarah A. Slifka
*Assistant Examiner* — Haroon S. Sheikh
(74) *Attorney, Agent, or Firm* — Brownstein Hyatt Farber Schreck, LLP

(57) ABSTRACT

In a first embodiment, a pre-formed pouch is provided that includes a plurality of walls joined in order to define an aperture. An assembly may be inserted into the aperture, which may then be sealed. Further, the pre-formed pouch may be fitted to the shape or dimensions of the assembly that will be inserted. In a second embodiment, an assembly may be covered in a plurality of layers of material, such as first layer of plastic, a layer of metal, and then a second layer of plastic. Each of the coverings may be formed by dipping the assembly in plastic or metal (or other material), molding layers around the assembly, coating the assembly in the layers, vapor depositing plastic or metal (or other material) onto the assembly, and/or a combination of these operations.

9 Claims, 9 Drawing Sheets

(52) U.S. Cl.
CPC ....... *H01M 2/0265* (2013.01); *H01M 2/0275* (2013.01); *H01M 10/04* (2013.01); *Y10T 29/4911* (2015.01); *Y10T 29/49108* (2015.01)

(56) References Cited

U.S. PATENT DOCUMENTS

| | | | |
|---|---|---|---|
| 5,134,046 A * | 7/1992 | Chow et al. | 429/176 |
| 5,523,179 A | 6/1996 | Chu | |
| 5,554,459 A | 9/1996 | Gozdz et al. | |
| 5,561,004 A | 10/1996 | Bates et al. | |
| 6,001,138 A | 12/1999 | Dix | |
| 6,319,631 B1 | 11/2001 | Bay et al. | |
| 6,410,189 B1 | 6/2002 | Yamada et al. | |
| 6,610,572 B1 | 8/2003 | Takei et al. | |
| 6,713,987 B2 | 3/2004 | Krasnov et al. | |
| 7,585,582 B2 | 9/2009 | Chen | |
| 7,927,744 B2 | 4/2011 | Mizutani et al. | |
| 7,931,989 B2 | 4/2011 | Klaassen | |
| 7,935,439 B2 | 5/2011 | Kim | |
| 7,939,195 B2 | 5/2011 | Salot et al. | |
| 7,959,769 B2 | 6/2011 | Zhang et al. | |
| 7,960,054 B2 | 6/2011 | Zhang et al. | |
| 8,044,813 B1 | 10/2011 | Dembo | |
| 8,153,301 B2 | 4/2012 | Jiang | |
| 8,168,322 B2 | 5/2012 | Krasnov et al. | |
| 8,431,264 B2 | 4/2013 | Neudecker et al. | |
| 8,435,312 B2 | 5/2013 | Chen | |
| 8,445,130 B2 | 5/2013 | Neudecker et al. | |
| 8,669,345 B2 | 3/2014 | Lee et al. | |
| 8,679,674 B2 | 3/2014 | Liang et al. | |
| 8,822,059 B2 | 9/2014 | Wang | |
| 8,956,761 B2 | 2/2015 | Reynolds et al. | |
| 8,993,172 B2 | 3/2015 | Upadhyaya | |
| 2005/0079418 A1 | 4/2005 | Kelley et al. | |
| 2005/0153078 A1 | 7/2005 | Bentley et al. | |
| 2005/0250010 A1 | 11/2005 | Kurihara et al. | |
| 2008/0032236 A1 | 2/2008 | Wallace | |
| 2008/0269829 A1 * | 10/2008 | Li | A61L 27/06 607/36 |
| 2009/0181303 A1 | 7/2009 | Neudecker et al. | |
| 2009/0193649 A1 | 8/2009 | Niessen et al. | |
| 2009/0208754 A1 | 8/2009 | Chu et al. | |
| 2009/0214899 A1 | 8/2009 | Shakespeare et al. | |
| 2009/0317708 A1 * | 12/2009 | Brandl | B32B 15/08 429/163 |
| 2010/0035152 A1 | 2/2010 | Sastry et al. | |
| 2010/0066683 A1 | 3/2010 | Chang et al. | |
| 2011/0123844 A1 | 5/2011 | Bhardwaj et al. | |
| 2011/0129594 A1 | 6/2011 | Kwak et al. | |
| 2011/0183183 A1 | 7/2011 | Grady et al. | |
| 2011/0195271 A1 * | 8/2011 | Zadesky | B23K 20/021 428/615 |
| 2011/0294015 A1 | 12/2011 | Pirk et al. | |
| 2011/0311876 A1 | 12/2011 | Sturgeon et al. | |
| 2012/0078317 A1 | 3/2012 | Wang et al. | |
| 2012/0251867 A1 | 10/2012 | Krasnov et al. | |
| 2013/0029205 A1 | 1/2013 | Adams | |
| 2013/0176654 A1 | 7/2013 | Wang et al. | |
| 2014/0007418 A1 | 1/2014 | Song | |
| 2014/0011067 A1 | 1/2014 | Baba et al. | |
| 2014/0147731 A1 | 5/2014 | Anastas et al. | |
| 2014/0147737 A1 | 5/2014 | Anastas et al. | |
| 2014/0147742 A1 | 5/2014 | Anastas et al. | |
| 2014/0264915 A1 | 9/2014 | Huang et al. | |
| 2014/0265915 A1 | 9/2014 | Huang et al. | |
| 2014/0272190 A1 | 9/2014 | Huang et al. | |
| 2014/0272541 A1 | 9/2014 | Huang et al. | |
| 2014/0272560 A1 | 9/2014 | Huang et al. | |
| 2014/0272561 A1 | 9/2014 | Huang et al. | |
| 2014/0273890 A1 | 9/2014 | Huang et al. | |
| 2015/0325862 A1 | 11/2015 | Song et al. | |
| 2016/0064719 A1 | 3/2016 | Bushnell et al. | |
| 2016/0093837 A1 | 3/2016 | Bushnell et al. | |

FOREIGN PATENT DOCUMENTS

| | | | |
|---|---|---|---|
| EP | 0792741 | 9/1997 | |
| EP | 0975031 | 1/2000 | |
| EP | 1804315 | 7/2007 | |
| EP | 2105983 | 9/2009 | |
| EP | 2481499 A2 * | 8/2012 | ............ B22D 17/18 |
| JP | 61032951 | 2/1986 | |
| JP | 63314770 | 12/1988 | |
| TV | I 306319 | 2/2009 | |
| TW | 201014020 | 4/2010 | |
| TW | 201218494 | 5/2012 | |
| WO | WO 08/007867 | 1/2008 | |
| WO | WO 12/086557 | 6/2012 | |
| WO | WO 12/090929 | 7/2012 | |
| WO | WO 12/114162 | 8/2012 | |

OTHER PUBLICATIONS

International Search Report and Written Opinion dated Apr. 9, 2014, PCT/US2013/066268, 13 pages.

Taiwanese Office Action dated Jul. 22, 2015, TW 102140548, 7 pages.

Taiwanese Search Report dated Mar. 29, 2016, TW 102140548, 11 pages.

Zhonghua et al., "Layered Cathode Materials Li [$Ni_xLi_{(1/3-2x/3)}Mn_{(2/3-x/d)}$]$O_2$ for Lithium-Ion Batteries," *Electrochemical and Solid-State Letters*, vol. 4, No. 11, 2001, pp. A191-A194.

* cited by examiner

BATTERY PACKAGING

CROSS-REFERENCE TO RELATED APPLICATION

This application claims the benefit under 35 U.S.C. § 119(e) of U.S. Provisional Patent Application No. 61/730,148, filed Nov. 27, 2012, entitled "Battery Packaging," the entirety of which is incorporated by reference as if fully recited herein.

TECHNICAL FIELD

This disclosure relates generally to batteries, and more specifically to packaging batteries to reduce space required for the packaging.

BACKGROUND

Many batteries comprise one or more cells that each include an anode and a cathode separated by one or more layers of electrolyte and/or other components. For example, a lithium-ion battery may include a cathode, a layer of lithium cobalt oxide placed over the cathode, a separator layer placed over the cathode, a layer of lithium placed over the separator, and an anode placed over the lithium layer. Often, electrolyte layers (such as lithium cobalt oxide) may be sensitive to environmental exposure. Packaging may be placed around an assembly of one or more cells in order to protect the assembly against moisture, oxygen, and/or other environmental components that may ruin the assembly.

Such packaging may include placing a cell between a lower pouch sheet and an upper pouch sheet and then sealing and folding the edges of the pouch sheets to reduce space consumed. However, the folded portions still add to the horizontal dimensions of the packaged cell. Also, the seals may leave empty space between the cell and the pouch, further increasing the horizontal dimensions of the packaged cell. Given that a particular battery often may be required to fit within particular size limitations of a device into which the battery is incorporated, any increase to portions of the dimensions of the battery not occupied by energy storing portions of the battery reduces battery density (the amount of energy that a battery can store within particular dimensions). Further, this sort of packaging generally requires the battery to be rectilinear, meaning that the battery cannot fit into a non-square region of a device (such as if a battery compartment has a rounded bottom).

SUMMARY

The present disclosure discloses batteries and methods of assembling batteries. In one or more first embodiments, a pre-formed pouch is provided that includes a plurality of walls joined in order to define an aperture. An assembly of one or more cells may be inserted into the aperture, which may then be sealed (such as heat sealed). In some cases, the seal may also be folded to reduce space. As the pre-formed pouch only includes one edge that may need to be sealed, less space may be required than by the prior art pouch forming techniques discussed above. Further, the pre-formed pouch may be formed with similar dimensions to the assembly that will be inserted (perhaps with sufficient extra material to allow for sealing and folding of the aperture). In this way, empty space between the assembly and the pre-formed pouch may be minimized, reducing contributions by packaging to battery dimensions. Also, the assembly need not be rectilinear (such as L-shaped) and the pre-formed pouch may be fitted to the shape of such a non-rectilinear assembly.

In one or more second embodiments, an assembly of one or more cells may be covered in a plurality of layers of different materials. In some cases, these layers may include a first layer of plastic, a layer of metal, and then a second layer of plastic. However, in other implementations other layered arrangements of various kinds of materials may be used. Each of the coverings may be formed by dipping the assembly in plastic or metal (and/or other materials), molding one or more of the layers around the assembly (such as by overmolding, i.e. molecularly adhering one or more of the layers to the assembly to form one cohesive component), coating the assembly in one or more of the layers (such as by spraying, sputtering, or painting the assembly in plastic, metal, or other material), vapor depositing plastic or metal (or other material) onto the assembly, and/or a combination of these operations. As the layers may be applied to the assembly instead of including the assembly in a pouch that includes edges requiring sealing, horizontal space may not be required for sealing and folding of edges.

Additionally, though embodiments of the present disclosure are discussed herein with respect to packaging batteries, it is understood that this is for the purposes of example. In various implementations, other electronic components that may need packaging may be packaged utilizing the disclosed techniques without departing from the scope of the present disclosure.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure

DETAILED DESCRIPTION

Figure 1A:
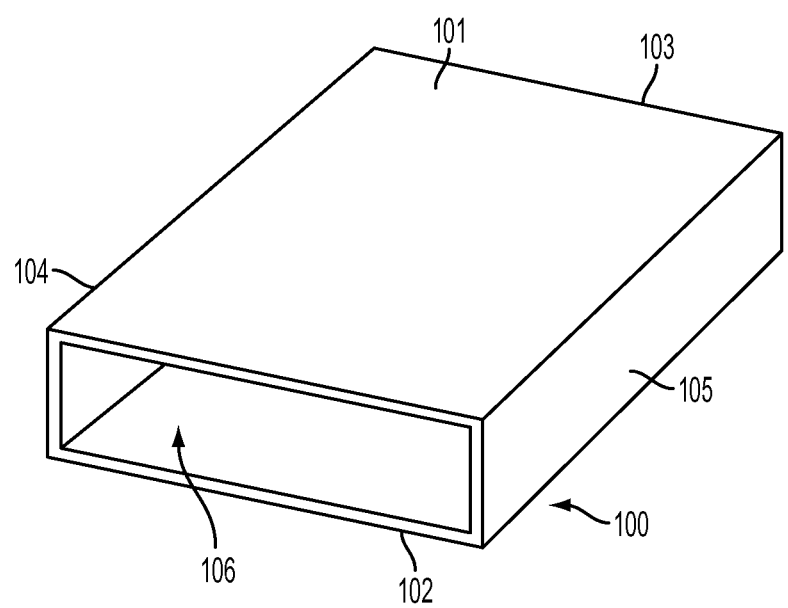
FIG. 1A is an isometric view of a battery pouch.

The description that follows includes sample systems, methods, and apparatuses that embody various elements of the present disclosure. However, it should be understood that the described disclosure may be practiced in a variety of forms in addition to those described herein.

The present disclosure discloses batteries and methods of assembling batteries and/or other electronic components. In one or more first embodiments, a pre-formed pouch is provided that includes a plurality of walls joined in order to define an aperture. An assembly of one or more cells may be inserted into the aperture, which may then be sealed (such as heat sealed). In some cases, the seal may also be folded to reduce space. As the pre-formed pouch only includes one edge that may need to be sealed, less space may be required than by the prior art pouch forming techniques discussed above. Further, the pre-formed pouch may be formed with similar dimensions to the assembly (i.e., preformed to fit a size and/or shape of the assembly) that will be inserted (perhaps with sufficient extra material to allow for sealing and folding of the aperture). In this way, empty space between the assembly and the pre-formed pouch may be minimized, reducing contributions by packaging to battery dimensions. Also, the assembly need not be rectilinear (such as L-shaped) and the pre-formed pouch may be fitted to the shape of such a non-rectilinear assembly.

In one or more second embodiments, an assembly of one or more cells may be covered in a plurality of layers of different materials. In some cases, these layers may include a first layer of plastic, a layer of metal, and then a second layer of plastic. However, in other implementations other layered arrangements of various kinds of materials may be used. Each of the coverings may be formed by dipping the assembly in plastic or metal (and/or other materials), molding one or more of the layers around the assembly (such as by overmolding), coating the assembly in one or more of the layers (such as by spraying, sputtering, or painting the assembly in plastic, metal, or other material), vapor depositing plastic or metal (or other material) onto the assembly, and/or a combination of these operations. As the layers may be applied to the assembly instead of including the assembly in a pouch that includes edges requiring sealing, horizontal space may not be required for sealing and folding of edges.

Additionally, though embodiments of the present disclosure are discussed herein with respect to packaging batteries, it is understood that this is for the purposes of example. In various implementations, other electronic components that may need packaging may be packaged utilizing the disclosed techniques without departing from the scope of the present disclosure.

Batteries and/or other electronic components packaged as described in any of the discussed embodiments may be utilized with a variety of different electronic devices. Such devices may include laptop computers, tablet computers, portable kitchen appliances, automobiles, mobile computers, cellular telephones, personal digital assistants, smart phones, music players, video players, wireless computer peripherals, and so on.

FIG. 1A illustrates a pre-formed pouch 100 that may be utilized to package an assembly of one or more cells of a battery (and/or another kind of electronic component assembly) in accordance with one or more first embodiments of the present disclosure. As illustrated, the pouch may include a top wall 101 joined to a first side wall 104, a second side wall 105, a back wall 103, and a bottom wall 102 in order to define an aperture 106. However, although the pouch is illustrated as having a rectilinear shape, it is understood that this is for the purposes of example. In other implementations the assembly and the pouch may have a shape that is non-rectilinear.

Each of the walls may comprise a laminate of multiple layers, such as a first layer of plastic, a layer of metal overlaying the first layer of plastic, and a second layer of plastic overlaying the layer of metal. The layers of the laminate may function to protect an assembly of one or more cells within the pouch from water vapor, oxygen, or other environmental components that may affect the assembly. However, although the walls are described as being made of a particular laminate of a particular number of layers of plastic and metal, other materials in various combinations of one or more layers are possible without departing from the scope of the present disclosure.

Figure 1B:
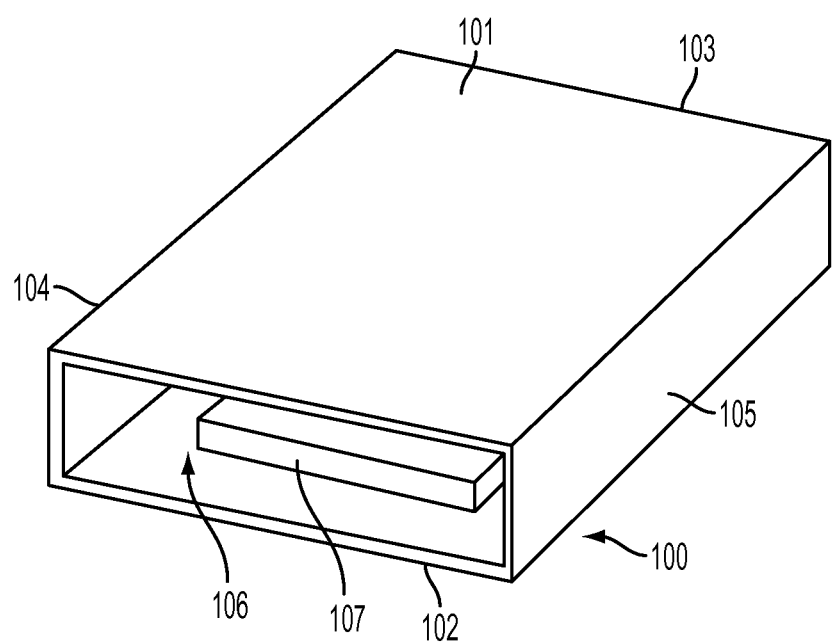
FIG. 1B is an isometric view of the battery pouch of FIG. 1A after a cell has been inserted into the battery pouch.

As illustrated in FIG. 1B, an assembly of one or more cells 107 may be inserted into the aperture 106. The assembly may include a single cell in some implementations. In other implementations, the assembly may include a stack or roll of multiple cells (such as a jelly roll assembly where a cathode material is laid down on an anode material, separated by a separator, before being rolled up). After the assembly is inserted, portions of the top wall 101, the first side wall 104, the second side wall 105, and/or the bottom wall 102 may be sealed (such as by heat sealing) and/or folded in order to seal the aperture. Thus, as the pre-formed pouch 100 need only include a single aperture that may need to be sealed, less space may be required than by the prior art pouch forming techniques discussed above.

Further, the pre-formed pouch 100 may be fitted to the assembly 107 that will be inserted. In some cases, the pouch 100 may be sized and/or shaped with dimensions similar to those of the assembly such that the assembly fits snugly within the pouch when inserted. In such cases, the walls may only include sufficient excess material that the aperture may be sealed (and possibly folded). In various cases, the assembly may be configured in a particular shape and one or more of the walls may be shaped similarly. For example, the assembly may be rectilinear and with a rounded end and the round end of the assembly may be the end that will be inserted into the pouch. As such, the back wall 103 of the pouch may be rounded similarly such that the assembly meets the back wall flush when inserted. However, in various cases the assembly may not be rectilinear and the pouch may not utilize a back wall.

Additionally, in some cases, the pouch 100 may be vacuum sealed when the aperture 106 is sealed. As vacuum sealing may remove air between the assembly 107 and the pouch, empty space between the assembly and the pouch may be reduced and the resultant packaged assembly may have smaller dimensions than would otherwise be possible without removal of the air.

Moreover, in some cases, the pouch 100 may be a material that shrinks when subjected to various processes, such as heat. In this way, the aperture 106 may be sealed by heating the pouch and effectively "shrink wrapping" the assembly inside. In such a case, the sealed pouch may have no sealed edges, even further reducing the dimensions required for the packaged assembly.

It is understood that the pouch 100 illustrated in FIGS. 1A and 1B is an example and the shape and dimensions of the pouch illustrated and described above are not intended to be limiting. Other pre-formed pouches of various shapes and dimensions are possible without departing from the scope of the present disclosure.

Figure 2:
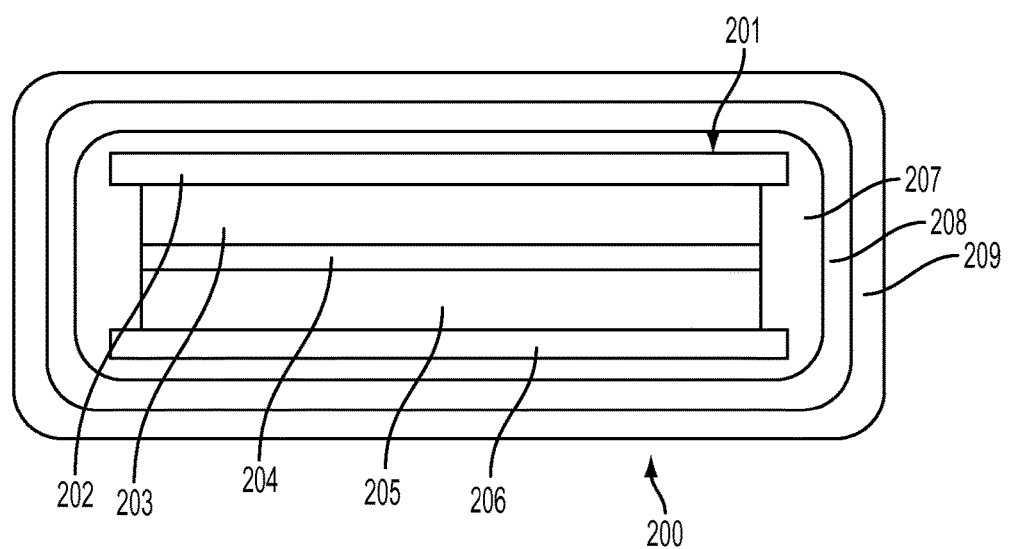
FIG. 2 is a front plan view of a battery.

FIG. 2 illustrates a packaged battery 200 in accordance with one or more second embodiments of the present disclosure. As illustrated, the packaged battery includes an assembly of one or more cells 201 covered in a first layer of plastic 207 (which may be any kind of plastic and/or a combination of different kinds of plastic), a layer of metal 208 (which may be any kind of metal and/or an alloy of one or more different kinds of metal), and then a second layer of plastic 209 (which may be any kind of plastic and/or a combination of different kinds of plastic).

The layers 207-209 may function to protect the assembly 201 from water vapor, oxygen, or other environmental components that may affect the assembly. However, although layers are described as being made of a particular sequence of particular materials, other materials in various combinations of one or more layers are possible without departing from the scope of the present disclosure.

As illustrated, the assembly 201 comprises one or more single lithium-ion cells. The cell includes a cathode 206, a layer of lithium cobalt oxide 205 on top of the cathode, a separator layer 204 on top of the lithium cobalt oxide layer, a layer of lithium 203 on top of the separator layer, and an anode 202 on top of the lithium layer. However, it is understood that the cell as illustrated and described above is for the purpose of example. Other cells of other types and configurations may be utilized without departing from the scope of the present disclosure. Further, although only a single cell is illustrated and described, in various implementations a stack or roll of multiple cells (such as a jelly roll assembly) may be utilized without departing from the scope of the present disclosure.

Each of the layers 207-209 may be formed by dipping the assembly 201 in plastic or metal (respectively), molding one or more of the layers around the assembly, coating the assembly in one or more of the layers (such as by spraying, sputtering, or painting the assembly in plastic or metal, respectively), vapor depositing plastic or metal (respectively) onto the assembly, and/or a combination of these operations. As the layers of plastic and metal may be applied to the assembly instead of including the assembly in a pouch that includes edges requiring sealing, horizontal space may not be required for sealing and folding of edges.

In implementations where one or more layers are molded around the assembly, one or more overmolding processes may be utilized. Such an overmolding process may include two-shot overmolding, insert overmolding (an injection molding process where one material is molded over a secondary material), and so on.

Figure 3:
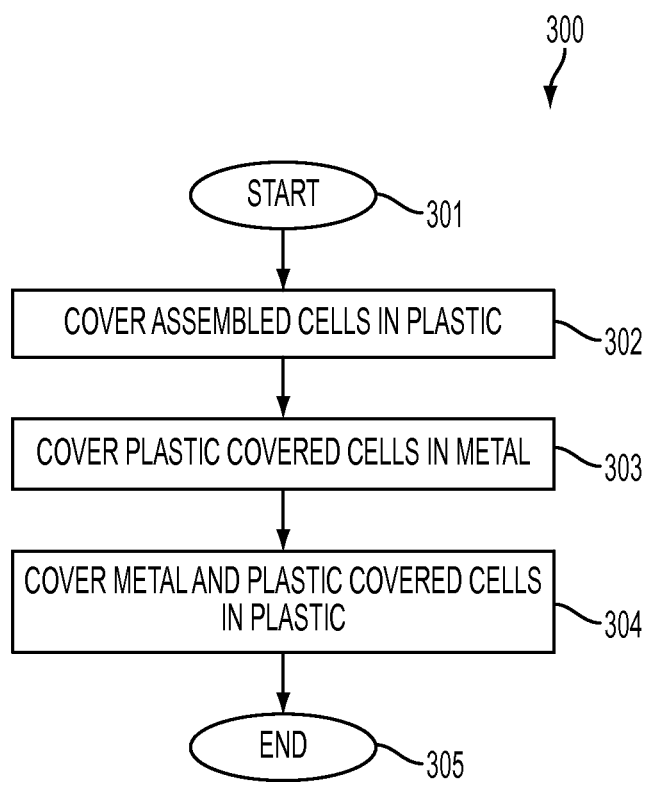
FIG. 3 is a method diagram illustrating a first example method for assembling a battery and/or another kind of electronic component. The battery assembled by this method may be the battery of FIG. 2.

FIG. 3 illustrates a method diagram illustrating a first example method 300 for assembling a battery. In some cases, the battery assembled by this method may be the packaged battery 200 of FIG. 2. Although the method 300 is illustrated and described as assembling a battery, it is understood that the method 300 may be utilized to assemble other electronic components without departing from the scope of the present disclosure.

The flow begins at block 301 and proceeds to block 302 where one or more cells of a battery are covered in plastic. The plastic may be any kind or type of liquid and/or semi-liquid plastic and/or may be a combination of various types or kinds of liquid and/or semi-liquid plastic. Next, the flow proceeds to block 303 where the plastic covered cell(s) is covered in metal. The metal may be any type or kind of liquid and/or semi-liquid metal and/or may be a combination or alloy of various types or kinds of liquid and/or semi-liquid metal. Then the flow proceeds to block 304 where the metal and plastic covered cell(s) is covered in plastic. The plastic may be any type or kind of liquid and/or semi-liquid plastic and/or may be a combination or alloy of various types or kinds of liquid and/or semi-liquid plastic. Finally, the flow proceeds to block 305 and ends.

Although the method 300 is illustrated and described above as including particular operations performed in a particular order, it is understood that different operations performed in a different order are possible without departing from the scope of the present disclosure.

By way of a first example, the method 300 is illustrated and described above as covering the cell(s) in a first layer of plastic followed by a layer of metal and then a second layer of plastic. However, in various implementations the cell(s) may be covered with various different layers of various different materials instead of a plastic-metal-plastic configuration. For example, various implementations may utilize materials impregnated by other materials, a single layer of a combination of materials (such as a layer of plastic-metal-plastic that is heated to shrink and seal around the assembly), multiple layers applied at a single time, and so on.

By way of a second example, the method 300 is illustrated and described above as covering the plastic covered cell(s) with metal immediately after covering them with the plastic and covering the metal and plastic covered cell(s) with plastic immediately after covering them with the metal. However, in various implementations, one or more layers may be allowed to set before the cell(s) is coated with the next layer. In some cases, materials used in layers may require setting and/or or time to set in order to not interfere with subsequent layers and/or be interfered with by subsequent layers.

Figure 4:
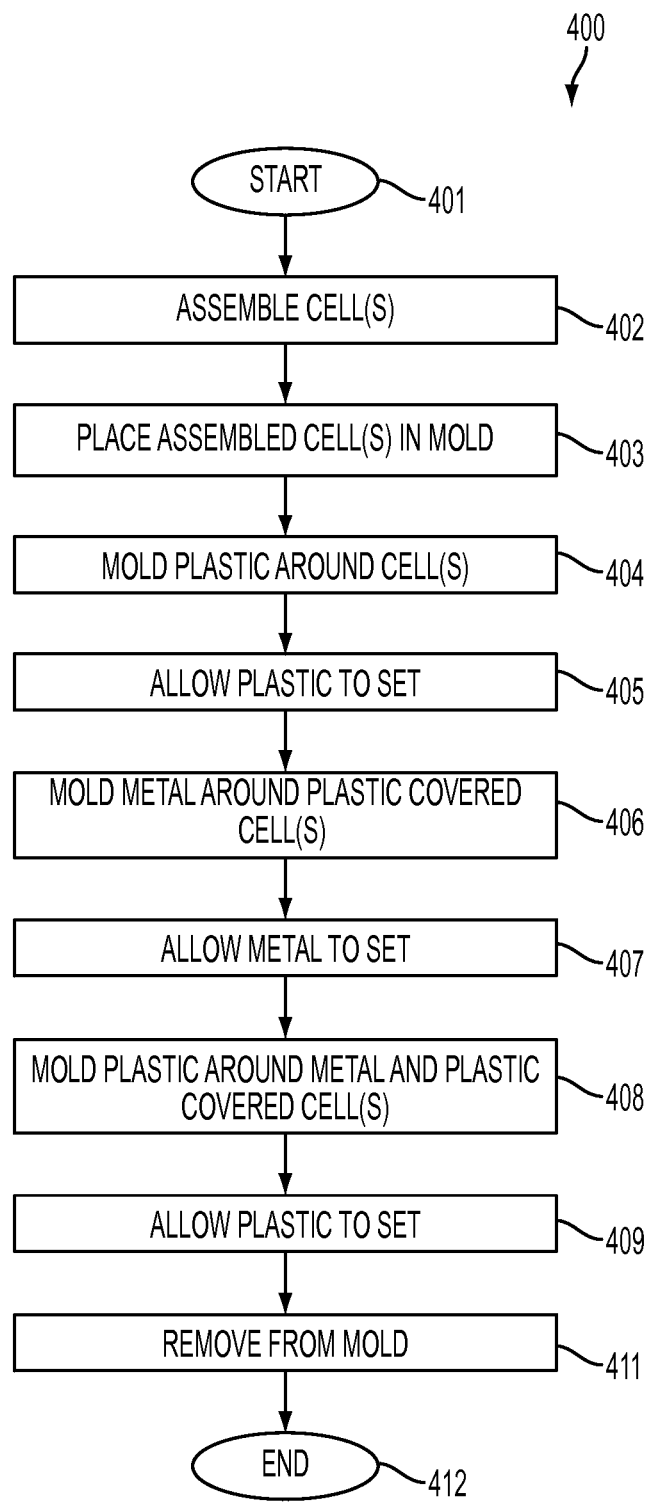
FIG. 4 is a method diagram illustrating a second example method for assembling a battery and/or another kind of electronic component. The battery assembled by this method may be the battery of FIG. 2.

FIG. 4 illustrates a method diagram illustrating a second example method 400 for assembling a battery. In some cases, the battery assembled by this method may be the packaged battery 200 of FIG. 2. Although the method 400 is illustrated and described as assembling a battery, it is understood that the method 400 may be utilized to assemble other electronic components without departing from the scope of the present disclosure.

The flow begins at block 401 and proceeds to block 402 where one or more cells of a battery are assembled. The flow then proceeds to block 403 where the assembly of cell(s) is placed into a mold. Next, the flow proceeds to block 404 where plastic is molded around the cell(s). The plastic may be any kind or type of plastic and/or may be a combination of various types or kinds of plastic. The flow then proceeds to block 405 where the plastic is allowed to set (such as by cooling, dissolving of one or more solvents, and/or other such operations).

Next, the flow proceeds to block 406 where metal is molded around the plastic covered cell(s). The metal may be any type or kind of metal and/or may be a combination or alloy of various types or kinds of metal. The flow then proceeds to block 407 where the metal is allowed to set (such as by cooling, dissolving of one or more solvents, and/or other such operations).

Next, the flow proceeds to block 408 where plastic is molded around the metal and plastic covered cell(s). The plastic may be any type or kind of plastic and/or may be a combination or alloy of various types or kinds of plastic. The flow then proceeds to block 409 where the plastic is allowed to set (such as by cooling, dissolving of one or more solvents, and/or other such operations).

The flow then proceeds to block 411 where the plastic-metal-plastic covered cell(s) is removed from the mold. Finally, the flow proceeds to block 412 and ends.

In various cases, one or more of the molding operations 404, 406, and/or 408 may be an overmolding process (the use of two separate materials that molecularly adhere to each other to form one cohesive component). Such an overmolding process may include two-shot overmolding, insert overmolding (an injection molding process where one material is molded over a secondary material), and so on. In such cases, plastic may be injection molded over the cell(s) in operation 404 to molecularly adhere the plastic to the cell(s), metal may be injected molded over the plastic covered cell(s) in operation 406 to molecularly adhere the metal to the plastic covered cell(s), and/or plastic may be injection molded over the metal and plastic covered cell(s) in operation 408 to molecularly adhere the plastic to the metal and plastic covered cell(s). However, in various cases, other types of molding processes may be utilized for one or more of the molding operations without departing from the scope of the present disclosure.

Although the method 400 is illustrated and described above as including particular operations performed in a particular order, it is understood that different operations performed in a different order are possible without departing from the scope of the present disclosure.

By way of a first example, the method 400 is illustrated and described above as using a single mold for molding operations 404, 406, and 408. However, in various implementations multiple molds may be utilized for one or more of molding operations 404, 406, and/or 408 without departing from the scope of the present disclosure.

By way of a second example, the method 400 is illustrated and described above as molding a first layer of plastic around the cell(s), a layer of metal around the plastic covered cell(s), and a second layer of plastic around the metal and plastic covered cell(s). However, in various implementations the cell(s) may be covered with various different layers of various different materials instead of a plastic-metal-plastic configuration.

By way of a third example, the method 400 is illustrated and described above as including operations 405, 407, and 409 for allowing molded layers to set. However, in various implementations, one or more layers may not be allowed to set before a next layer is molded around it. In some cases, materials used in layers may not require setting and/or or time to set in order to not interfere with subsequent layers and/or be interfered with by subsequent layers.

Figure 5:
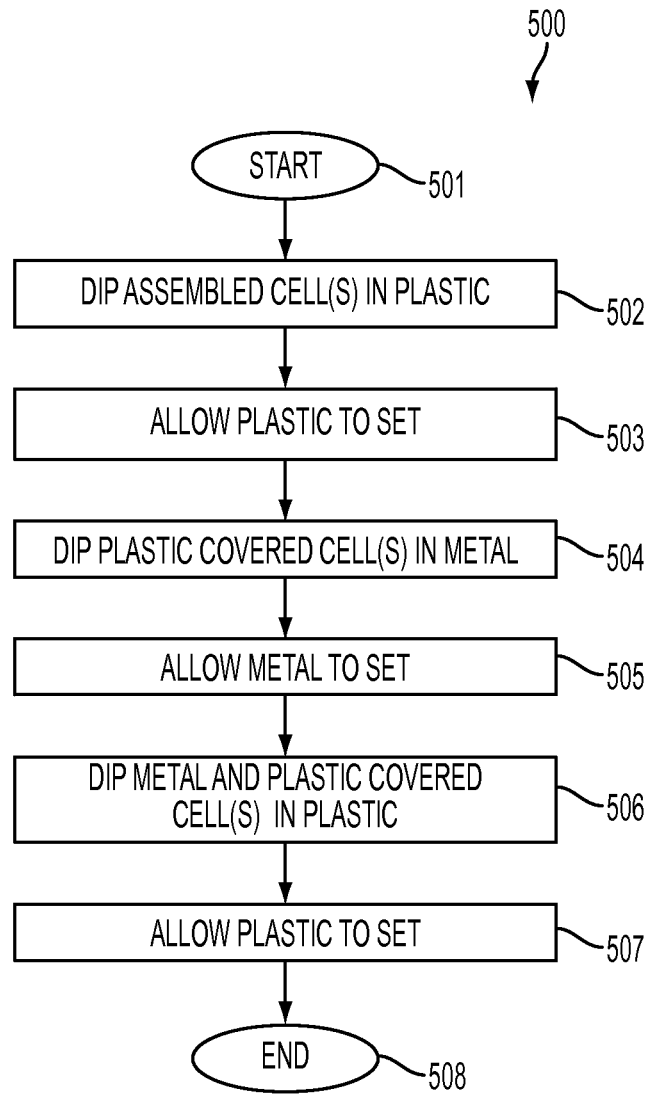
FIG. 5 is a method diagram illustrating a third example method for assembling a battery and/or another kind of electronic component. The battery assembled by this method may be the battery of FIG. 2.

FIG. 5 illustrates a method diagram illustrating a third example method 500 for assembling a battery. In some cases, the battery assembled by this method may be the packaged battery 200 of FIG. 2. Although the method 500 is illustrated and described as assembling a battery, it is understood that the method 500 may be utilized to assemble other electronic components without departing from the scope of the present disclosure.

The flow begins at block 501 and proceeds to block 502 where one or more cells of a battery are dipped in plastic. The plastic may be any kind or type of liquid and/or semi-liquid plastic and/or may be a combination of various types or kinds of liquid and/or semi-liquid plastic. The flow then proceeds to block 503 where the plastic is allowed to set (such as by cooling, dissolving of one or more solvents, and/or other such operations).

Next, the flow proceeds to block 504 where the plastic covered cell(s) is dipped in metal. The metal may be any type or kind of liquid and/or semi-liquid metal and/or may be a combination or alloy of various types or kinds of liquid and/or semi-liquid metal. The flow then proceeds to block 505 where the metal is allowed to set (such as by cooling, dissolving of one or more solvents, and/or other such operations).

Next, the flow proceeds to block 506 where the metal and plastic covered cell(s) is dipped in plastic. The plastic may be any type or kind of liquid and/or semi-liquid plastic and/or may be a combination or alloy of various types or kinds of liquid and/or semi-liquid plastic. The flow then proceeds to block 507 where the plastic is allowed to set (such as by cooling, dissolving of one or more solvents, and/or other such operations). Finally, the flow proceeds to block 508 and ends.

Although the method 500 is illustrated and described above as including particular operations performed in a particular order, it is understood that different operations performed in a different order are possible without departing from the scope of the present disclosure.

By way of a first example, the method 500 is illustrated and described above as dipping the cell(s) in a first layer of plastic, followed by a layer of metal, and followed by a second layer of plastic. However, in various implementations the cell(s) may be covered with various different layers of various different materials instead of a plastic-metal-plastic configuration.

By way of a second example, the method 500 is illustrated and described above as including operations 503, 505, and 507 for allowing dipped layers to set. However, in various implementations, one or more layers may not be allowed to set before the assembly is dipped into the next layer. In some cases, materials used in layers may not require setting and/or or time to set in order to not interfere with subsequent layers and/or be interfered with by subsequent layers.

Figure 6:
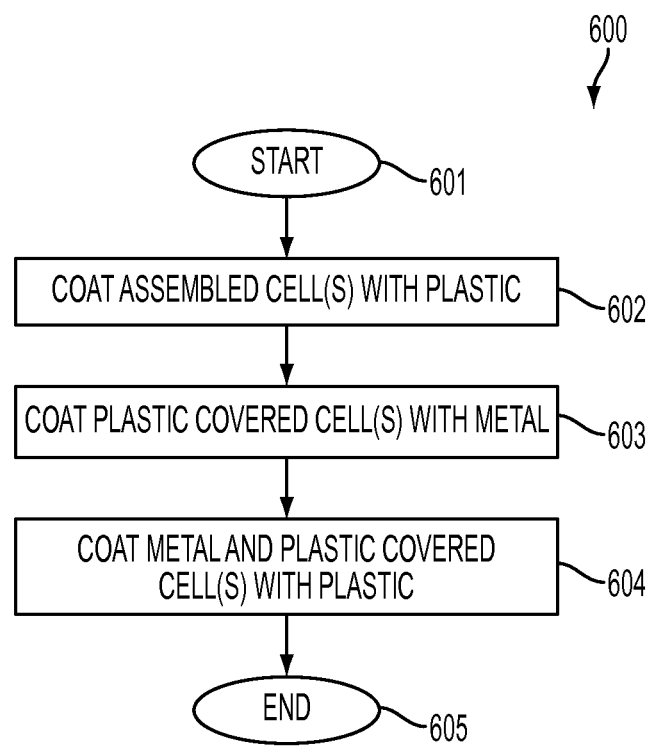
FIG. 6 is a method diagram illustrating a fourth example method for assembling a battery and/or another kind of electronic component. The battery assembled by this method may be the battery of FIG. 2.

FIG. 6 illustrates a method diagram illustrating a fourth example method 600 for assembling a battery. In some cases, the battery assembled by this method may be the packaged battery 200 of FIG. 2. Although the method 600 is illustrated and described as assembling a battery, it is understood that the method 600 may be utilized to assemble other electronic components without departing from the scope of the present disclosure.

The flow begins at block 601 and proceeds to block 602 where one or more cells of a battery are coated with plastic. The plastic may be any kind or type of liquid and/or semi-liquid plastic and/or may be a combination of various types or kinds of liquid and/or semi-liquid plastic. The coating may be applied by any kind of coating process, such as by painting the cell(s) with the plastic, sputtering the plastic onto the cell(s), spraying the plastic onto the cell(s), and so on.

Next, the flow proceeds to block 603 where the plastic covered cell(s) is coated with metal. The metal may be any type or kind of liquid and/or semi-liquid metal and/or may be a combination or alloy of various types or kinds of liquid and/or semi-liquid metal. The coating may be applied by any kind of coating process, such as by painting the cell(s) with the metal, sputtering the metal onto the cell(s), spraying the metal onto the cell(s), and so on.

Then the flow proceeds to block 604 where the metal and plastic covered cell(s) is coated with plastic. The plastic may be any type or kind of liquid and/or semi-liquid plastic and/or may be a combination or alloy of various types or kinds of liquid and/or semi-liquid plastic. The coating may be applied by any kind of coating process, such as by painting the cell(s) with the plastic, sputtering the plastic onto the cell(s), spraying the plastic onto the cell(s), and so on. Finally, the flow proceeds to block 605 and ends.

Although the method 600 is illustrated and described above as including particular operations performed in a particular order, it is understood that different operations performed in a different order are possible without departing from the scope of the present disclosure.

By way of a first example, the method 600 is illustrated and described above as coating the cell(s) with a first layer of plastic followed by a layer of metal and then a second layer of plastic. However, in various implementations the cell(s) may be covered with various different layers of various different materials instead of a plastic-metal-plastic configuration.

By way of a second example, the method 600 is illustrated and described above as coating the plastic covered cell(s) with metal immediately after coating them with the plastic and coating the metal and plastic covered cell(s) with plastic immediately after coating them with the metal. However, in various implementations, one or more layers may be allowed to set before the cell(s) is coated with the next layer. In some cases, materials used in layers may require setting and/or or time to set in order to not interfere with subsequent layers and/or be interfered with by subsequent layers.

Figure 7:
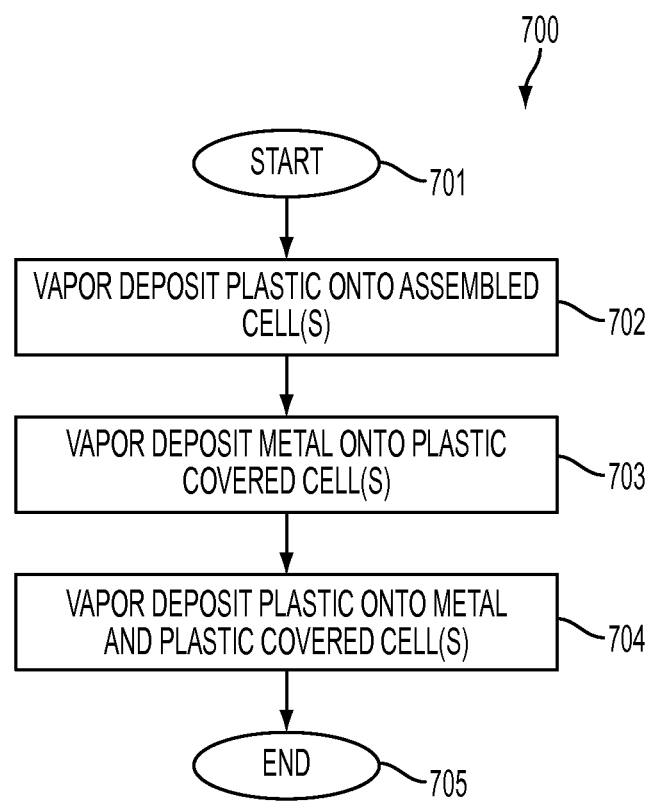
FIG. 7 is a method diagram illustrating a fifth example method for assembling a battery and/or another kind of electronic component. The battery assembled by this method may be the battery of FIG. 2.

FIG. 7 illustrates a method diagram illustrating a fifth example method 700 for assembling a battery. In some cases, the battery assembled by this method may be the packaged battery 200 of FIG. 2. Although the method 700 is illustrated and described as assembling a battery, it is understood that the method 700 may be utilized to assemble other electronic components without departing from the scope of the present disclosure.

The flow begins at block 701 and proceeds to block 702 where plastic is vapor deposited onto one or more cells of a battery. The plastic may be any kind or type of liquid and/or semiliquid plastic and/or may be a combination of various types or kinds of liquid and/or semi-liquid plastic. The plastic may be applied by any kind of vapor deposition process, such as by physical vapor deposition, chemical vapor deposition, electroplating, and so on.

Next, the flow proceeds to block 703 where metal is vapor deposited onto the plastic covered cell(s). The metal may be any type or kind of liquid and/or semi-liquid metal and/or may be a combination or alloy of various types or kinds of liquid and/or semi-liquid metal. The metal may be applied by any kind of vapor deposition process, such as by physical vapor deposition, chemical vapor deposition, electroplating, and so on.

Then the flow proceeds to block 704 where plastic is vapor deposited onto the metal and plastic covered cell(s). The plastic may be any type or kind of liquid and/or semi-liquid plastic and/or may be a combination or alloy of various types or kinds of liquid and/or semi-liquid plastic. The plastic may be applied by any kind of vapor deposition process, such as by physical vapor deposition, chemical vapor deposition, electroplating, and so on. Finally, the flow proceeds to block 705 and ends.

Although the method 700 is illustrated and described above as including particular operations performed in a particular order, it is understood that different operations performed in a different order are possible without departing from the scope of the present disclosure.

By way of a first example, the method 700 is illustrated and described above as vapor depositing a first layer of plastic onto the cell(s) followed by a layer of metal and then a second layer of plastic. However, in various implementations the cell(s) may be covered with various different layers of various different materials instead of a plastic-metal-plastic configuration.

By way of a second example, the method 700 is illustrated and described above as vapor depositing metal onto the plastic covered cell(s) immediately after vapor depositing plastic onto them and vapor depositing plastic onto the metal and plastic covered cell(s) immediately after vapor depositing metal onto them. However, in various implementations, one or more layers may be allowed to set before the cell(s) the next layer is vapor deposited. In some cases, materials used in layers may require setting and/or or time to set in order to not interfere with subsequent layers and/or be interfered with by subsequent layers.

Further, methods 400-700 are illustrated and described above as applying the various layers utilizing the same type of process. However, in other implementations, a combination of these various processes (and/or other processes) may be utilized to apply various layers of packaging.

Figure 8:
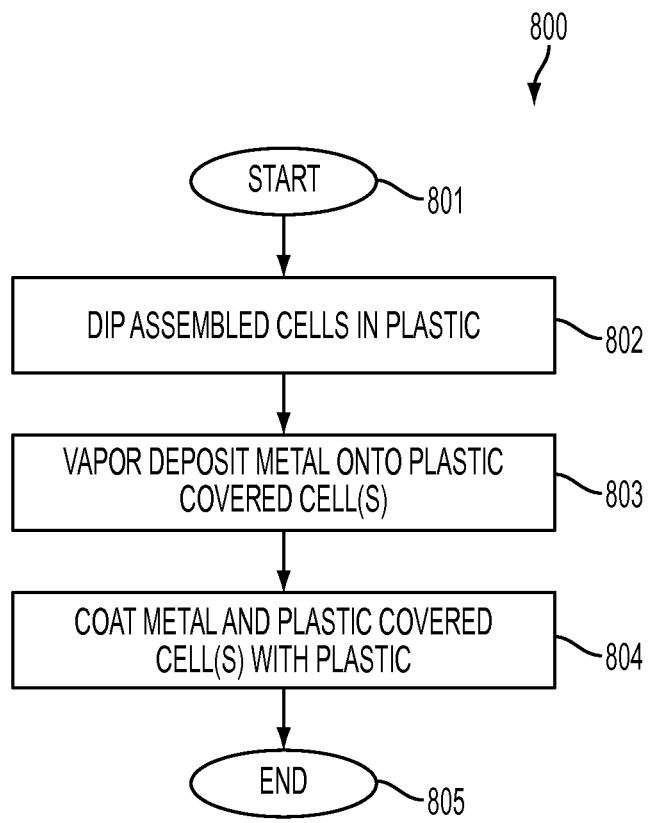
FIG. 8 is a method diagram illustrating a sixth example method for assembling a battery and/or another kind of electronic component. The battery assembled by this method may be the battery of FIG. 2

For example, FIG. 8 illustrates a method diagram illustrating a sixth example method 800 for assembling a battery. In some cases, the battery assembled by this method may be the packaged battery 200 of FIG. 2. Although the method 800 is illustrated and described as assembling a battery, it is understood that the method 800 may be utilized to assemble other electronic components without departing from the scope of the present disclosure.

The flow begins at block 801 and proceeds to block 802 where one or more cells of a battery are dipped in plastic. The plastic may be any kind or type of liquid and/or semi-liquid plastic and/or may be a combination of various types or kinds of liquid and/or semi-liquid plastic.

Next, the flow proceeds to block 803 where metal is vapor deposited onto the plastic covered cell(s). The metal may be any type or kind of liquid and/or semi-liquid metal and/or may be a combination or alloy of various types or kinds of liquid and/or semi-liquid metal. The metal may be applied by any kind of vapor deposition process, such as by physical vapor deposition, chemical vapor deposition, electroplating, and so on.

Then, the flow proceeds to block 804 where the metal and plastic covered cell(s) is coated with plastic. The plastic may be any type or kind of liquid and/or semi-liquid plastic and/or may be a combination or alloy of various types or kinds of liquid and/or semi-liquid plastic. The coating may be applied by any kind of coating process, such as by painting the cell(s) with the plastic, sputtering the plastic onto the cell(s), spraying the plastic onto the cell(s), and so on. Finally, the flow proceeds to block 805 and ends.

Although the method 800 is illustrated and described above as including particular operations performed in a particular order, it is understood that different operations performed in a different order are possible without departing from the scope of the present disclosure.

By way of a first example, the method 800 is illustrated and described above as dipping the cell(s) in plastic followed by vapor depositing metal onto the plastic covered cell(s) and coating the metal and plastic covered cell(s) in plastic. However, in various implementations the cell(s) may be covered with various different layers of various different materials instead of a plastic-metal-plastic configuration.

By way of a second example, the method 800 is illustrated and described above as applying subsequent layers immediately after applying previous layers. However, in various implementations, one or more layers may be allowed to set before the next layer is applied. In some cases, materials used in layers may require setting and/or or time to set in order to not interfere with subsequent layers and/or be interfered with by subsequent layers.

By way of a third example, the method 800 is utilized as including a particular arrangement of procedures discussed with respect to the methods 400-700. This is for the purposes of example and it is understood that any number of procedures from methods 400-700 may be combined in a variety of orders such as: molding plastic around an electronic component, molding metal around the electronic component, and dipping the electronic component in plastic; molding plastic around an electronic component, dipping the electronic component in metal, and molding plastic around the electronic component; coating an electronic component in plastic, vapor depositing metal on the electronic component, and dipping the electronic component in plastic; and/or any other combination of operations discussed with respect to the methods 400-700.

The various implementations discussed herein describe packaging an assembly of one or more cells in order to protect the assembly from environmental elements. However, it should be understood that the assembly need not be completely isolated by the discussed packaging. For example, in some cases one or more electrical contacts may extend through the packaging to the assembly in order to allow energy or power to be obtained from and/or transmitted to the assembly.

In the present disclosure, the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A method for assembling a battery, the method comprising:
    coating a battery cell, including at least an anode and a cathode, in at least one first layer of plastic such that the at least one first layer of plastic directly contacts the anode and the cathode;
    molding at least one layer of metal around the at least one first layer of plastic, the at least one layer of metal being liquid or semi-liquid during the molding; and
    covering the at least one layer of metal in at least one second layer of plastic.

2. The method of claim 1, wherein said operation of molding at least one layer of metal around the at least one first layer of plastic comprises
    placing the battery cell in at least one mold after coating the battery cell in the at least one first layer of plastic and molding the at least one layer of metal around the at least one first layer of plastic.

3. The method of claim 2, wherein said operation of molding at least one layer of metal around the at least one first layer of plastic comprises molding multiple layers of metal around the at least one first layer of plastic and allowing a first layer of metal to cool before molding a next layer of metal.

4. The method of claim 2, wherein said operation of molding at least one layer of metal around the at least one first layer of plastic comprises molding multiple layers of metal around the at least one first layer of plastic without allowing a first layer of metal to set before molding a next layer of metal.

5. The method of claim 1, wherein said operation of covering the at least one layer of metal in at least one second layer of plastic comprises at least one of:
    placing the battery cell in at least one mold after covering the at least one first layer of plastic in the at least one layer of metal and molding the at least one second layer of plastic around the at least one layer of metal;
    coating the cell in plastic after covering the at least one first layer of plastic in the at least one layer of metal;
    coating the at least one layer of metal with the at least one second layer of plastic; or
    vapor depositing the at least one second layer of plastic on the at least one layer of metal.

6. The method of claim 5, wherein said operation of covering the at least one layer of metal in at least one second layer of plastic comprises coating the at least one layer of metal with the at least one second layer of plastic and said operation of coating the at least one layer of metal with the at least one second layer of plastic comprises painting the at least one second layer of plastic on the at least one layer of metal.

7. The method of claim 5, wherein said operation of covering the at least one layer of metal in at least one second layer of plastic comprises coating the at least one layer of metal with the at least one second layer of plastic and said operation of coating the at least one layer of metal with the at least one second layer of plastic comprises spraying or sputtering the at least one second layer of plastic onto the at least one layer of metal.

8. The method of claim 1, wherein the battery cell comprises a stack of cells.

9. The method of claim 1, wherein the battery cell comprises a jelly roll.

* * * * *